United States Patent
Shao (10) Patent No.: US 10,500,504 B2
(45) Date of Patent: Dec. 10, 2019

(54) SHOOTING GAME CONTROL METHOD AND APPARATUS, STORAGE MEDIUM, PROCESSOR, AND TERMINAL

(71) Applicant: NETEASE (HANGZHOU) NETWORK CO., LTD., Zhejiang (CN)

(72) Inventor: Teng Shao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/106,031

(22) Filed: Aug. 21, 2018

(65) Prior Publication Data

US 2019/0060767 A1    Feb. 28, 2019

(30) Foreign Application Priority Data

Aug. 28, 2017 (CN) .......................... 2017 1 0751909

(51) Int. Cl.
*A63F 13/00* (2014.01)
*A63F 13/837* (2014.01)
(Continued)

(52) U.S. Cl.
CPC ........ *A63F 13/837* (2014.09); *A63F 13/2145* (2014.09); *A63F 13/426* (2014.09);
(Continued)

(58) Field of Classification Search
None
See application file for complete search history.

(56) References Cited

U.S. PATENT DOCUMENTS 8,675,019 B1 * 3/2014 Feinstein .............. G09G 5/026
345/634
9,533,225 B2   1/2017 Sakurai
(Continued)

FOREIGN PATENT DOCUMENTS

CN   103372318 A   10/2013
CN   104516559 A    4/2015
(Continued)

OTHER PUBLICATIONS

Search report of CN Priority application No. 201710751909.4 filed on Aug. 28, 2017, dated Jun. 20, 2018.

*Primary Examiner* — Paul A D'Agostino
(74) *Attorney, Agent, or Firm* — Gang Yu (57) ABSTRACT

A shooting game control method and apparatus is provided. The method includes: a virtual joystick control is provided on a graphical user interface, and a virtual character is configured to move in a game scene; a presentation view of the game scene is configured to be changed according to a screen sliding operation detected in a first touch area, and the virtual character is configured to shoot a position pointed by a crosshair displayed under a current presentation view according to a click operation detected in a second touch area; and when the screen sliding operation in the first touch area and the click operation in the second touch area are detected at the same time, triggering the virtual character to shoot the position pointed by the crosshair displayed under the current presentation view during a process of changing the presentation view according to the screen sliding operation.

15 Claims, 3 Drawing Sheets

(51) Int. Cl.
*A63F 13/2145* (2014.01)
*A63F 13/426* (2014.01)

(52) U.S. Cl.
CPC ............... *A63F 2300/1075* (2013.01); *A63F 2300/8076* (2013.01)

(56) References Cited

U.S. PATENT DOCUMENTS

| | | | | |
|---|---|---|---|---|
| 2005/0110768 | A1* | 5/2005 | Marriott | G06F 3/03547 345/173 |
| 2007/0238529 | A1* | 10/2007 | Iwamoto | H04W 4/60 463/42 |
| 2008/0146328 | A1* | 6/2008 | Ishii | A63F 13/10 463/31 |
| 2011/0256912 | A1* | 10/2011 | Baynes | A63F 13/803 463/6 |
| 2011/0273473 | A1* | 11/2011 | Kim | G06T 19/00 345/629 |
| 2012/0007854 | A1* | 1/2012 | Cho | G06F 3/04883 345/419 |
| 2012/0194461 | A1* | 8/2012 | Lim | G06F 3/03547 345/173 |
| 2012/0223894 | A1* | 9/2012 | Zhao | G06F 3/0488 345/173 |
| 2013/0127980 | A1* | 5/2013 | Haddick | G06F 3/013 348/14.08 |
| 2014/0191977 | A1* | 7/2014 | Feng | G06F 3/018 345/173 |
| 2014/0243058 | A1 | 8/2014 | Tsuchiya et al. | |
| 2014/0243089 | A1* | 8/2014 | Tsukioka | A63F 13/12 463/31 |
| 2014/0245367 | A1* | 8/2014 | Sasaki | H04N 21/4402 725/109 |
| 2014/0368441 | A1* | 12/2014 | Touloumtzis | G06F 3/017 345/173 |
| 2014/0379946 | A1* | 12/2014 | Zhang | G06F 3/038 710/67 |
| 2016/0059131 | A1* | 3/2016 | Ye | A63F 13/537 463/31 |

FOREIGN PATENT DOCUMENTS

| | | |
|---|---|---|
| CN | 105446525 A | 3/2016 |
| CN | 105468279 A | 4/2016 |
| CN | 105582670 A | 5/2016 |
| CN | 105688409 A | 6/2016 |
| CN | 105930054 A | 9/2016 |
| CN | 106843667 A | 6/2017 |
| JP | 2014171860 A | 9/2014 |

* cited by examiner

SHOOTING GAME CONTROL METHOD AND APPARATUS, STORAGE MEDIUM, PROCESSOR, AND TERMINAL

CROSS-REFERENCE TO RELATED APPLICATIONS

The present disclosure claims priority of Chinese Patent Application No. 201710751909.4, filed to China Patent Office on Aug. 28, 2017. Contents of the present disclosure are hereby incorporated by reference in entirety of the Chinese Patent Application.

TECHNICAL FIELD

The present disclosure relates to game interaction control, and in particular to a shooting game control method and apparatus.

BACKGROUND

In a First-Person Shooter (FPS) game and a Third-Person Shooter (TPS) game running on a mobile terminal with a touch screen, a player usually needs to change an view angle, and moves a shooting crosshair by performing at least one sliding operation on the touch screen, and triggers a shooting instruction by performing at least one clicking operation on a shooting button arranged on the touch screen. Under normal circumstances, the player needs to firstly adjust the crosshair and then clicks the shooting button. In this case, at least one sliding operation performed on the touch screen for adjusting the crosshair and at least one clicking operation performed on the shooting button for sending the shooting instruction are separate for the player. That is, after the player performs the at least one sliding operation on the touch screen, the player needs to move at least one finger to execute the at least one clicking operation on the shooting button.

SUMMARY

At least some embodiments of the present disclosure provide a shooting game control method and apparatus, a storage medium, and a terminal.

In one embodiment of the present disclosure, a shooting game control method is provided. The method is applied to a mobile terminal including a touch screen and provided by executing a software application on a processor of the mobile terminal and rendering a graphical user interface on the touch screen. Contents presented on the graphical user interface at least partially include a game scene and at least partially include a virtual character. The method includes:

providing a virtual joystick control on the graphical user interface, and configuring the virtual character to move in the game scene in response to at least one touch operation on the virtual joystick control; providing a first touch area and a second touch area on the graphical user interface, and the second touch area inculdes the first touch area or the second touch area is overlapped with the first touch area; configuring a presentation view of the game scene to be changed according to a screen sliding operation detected in the first touch area, and configuring the virtual character to shoot a position pointed by a crosshair displayed under a current presentation view according to a click operation detected in the second touch area; and when the screen sliding operation in the first touch area and the click operation in the second touch area are detected at the same time, triggering the virtual character to shoot the position pointed by the crosshair displayed under the current presentation view during a process of changing the presentation view according to the screen sliding operation.

In another embodiment of the present disclosure, a shooting game control apparatus is also provided. The apparatus is applied to a mobile terminal including a touch screen, and provided by executing a software application on a processor of the mobile terminal and rendering a graphical user interface on the touch screen. Contents presented on the graphical user interface at least partially include a game scene and at least partially include a virtual character. The apparatus includes:

a virtual joystick control component, configured to provide a virtual joystick control on the graphical user interface, and to configure the virtual character to move in the game scene in response to at least one touch operation on the virtual joystick control; a touch area control component, configured to provide a first touch area and a second touch area on the graphical user interface, and the second touch area includes the first touch area or the second touch area is overlapped with the first touch area; a touch operation detection component, configured to configure a presentation view of the game scene to be changed according to a screen sliding operation detected in the first touch area, and to configure the virtual character to shoot a position pointed by a crosshair displayed under a current presentation view according to a click operation detected in the second touch area; and a touch instruction execution component, configured to trigger, when the screen sliding operation in the first touch area and the click operation in the second touch area are detected at the same time, triggering the virtual character to shoot the position pointed by the crosshair displayed under the current presentation view during a process of changing the presentation view according to the screen sliding operation.

In another embodiment of the present disclosure, a storage medium is also provided. The storage medium includes at least one stored program, and when the at least one program is run, a device where the storage medium is located is controlled to execute the above shooting game control method.

In another embodiment of the present disclosure, a processor is also provided. The processor is configured to run at least one program, and the at least one program is run to execute the above shooting game control method.

In another embodiment of the present disclosure, a terminal is also provided. The terminal includes at least one processor, a memory, a display apparatus and at least one program, and the at least one program is stored in the memory, and configured to be performed by the at least one processor. The at least one program is used for performing the above shooting game control method.

DETAILED DESCRIPTION

It should be noted that the embodiments in the present disclosure and the features in the embodiments may be combined with each other without conflict. The present disclosure will be described in detail below with reference to the drawings in conjunction with the embodiments.

In order to enable those skilled in the art to better understand the solution of the present disclosure, the technical solutions in the embodiments of the present disclosure will be described clearly and completely in conjunction with the drawings in the embodiments of the present disclosure.

In some FPS and TPS games, a player has to adjust a crosshair and then clicks a shooting button. In a time interval when the player adjusts the crosshair to a shooting target until performing a click operation on the shooting button, since the position of shooting target is changed, it is possible that the shooting target cannot be shot accurately in time.

In some other FPS and TPS games, while shooting, the player may adjust an view angle and a position of the crosshair by pressing and dragging the shooting button. In this case, although the above problem that the shooting target cannot be shot accurately in time is solved, before dragging the shooting button for the adjustment of the view angle and the crosshair, the shooting button should be pressed first, which will trigger an unnecessary shooting action, resulting in the problems of position exposure, waste of ammunition and the like, and causing a bad gaming experience for the player.

Figure 1:
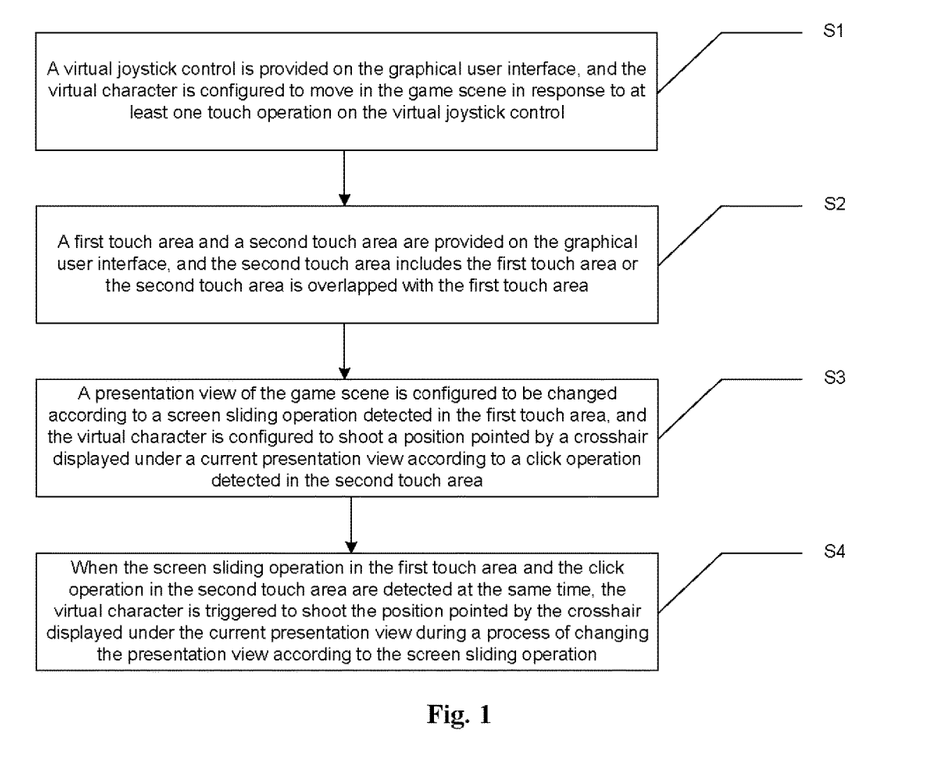
FIG. 1 is a flowchart of a shooting game control method according to an embodiment of the present disclosure.

In one embodiment of the present disclosure, a shooting game control method is provided. The method is applied to a mobile terminal including a touch screen, and provided by executing a software application on a processor of the mobile terminal and rendering a graphical user interface on the touch screen. Contents presented on the graphical user interface at least partially include a game scene and at least partially include a virtual character. FIG. 1 is a flowchart of a shooting game control method according to an embodiment of the present disclosure. As shown in FIG. 1, the method includes the steps as follows.

At step S1, a virtual joystick control is provided on the graphical user interface, and the virtual character is configured to move in the game scene in response to at least one touch operation on the virtual joystick control.

At step S2, a first touch area and a second touch area are provided on the graphical user interface, and the second touch area includes the first touch area or the second touch area is overlapped with the first touch area.

At step S3, a presentation view of the game scene is configured to be changed according to a screen sliding operation detected in the first touch area, and the virtual character is configured to shoot a position pointed by a crosshair displayed under a current presentation view according to a click operation detected in the second touch area.

At step S4, when the screen sliding operation in the first touch area and the click operation in the second touch area are detected at the same time, the virtual character is triggered to shoot the position pointed by the crosshair displayed under the current presentation view during a process of changing the presentation view according to the screen sliding operation.

The steps of the shooting game control method in the present exemplary embodiment will be further described below with reference to FIG. 2 and FIG. 3.

Figure 2:
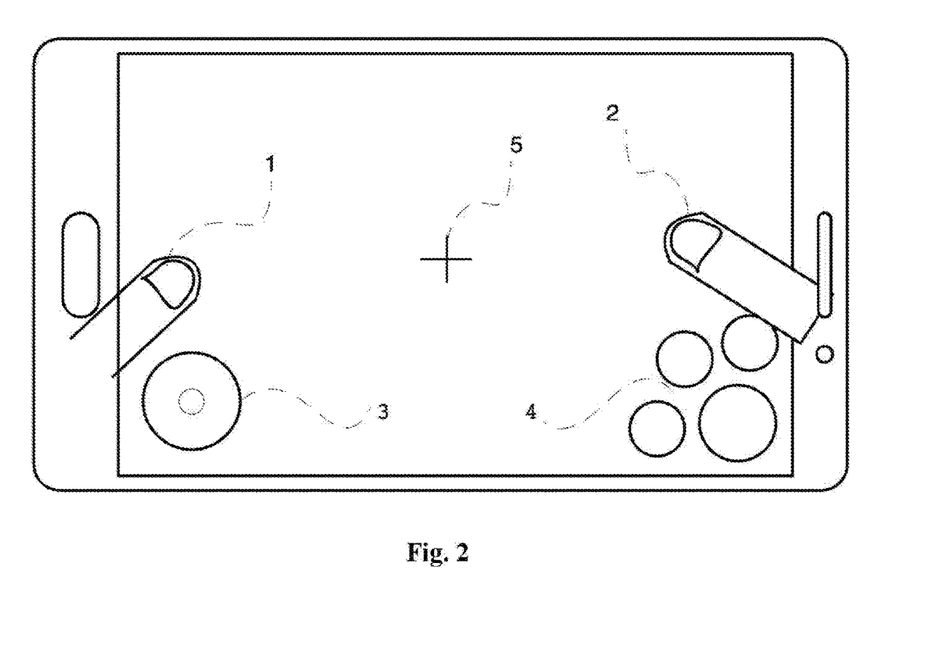
FIG. 2 is a schematic diagram of a game interface according to an exemplary embodiment of the present disclosure.
Figure 3:
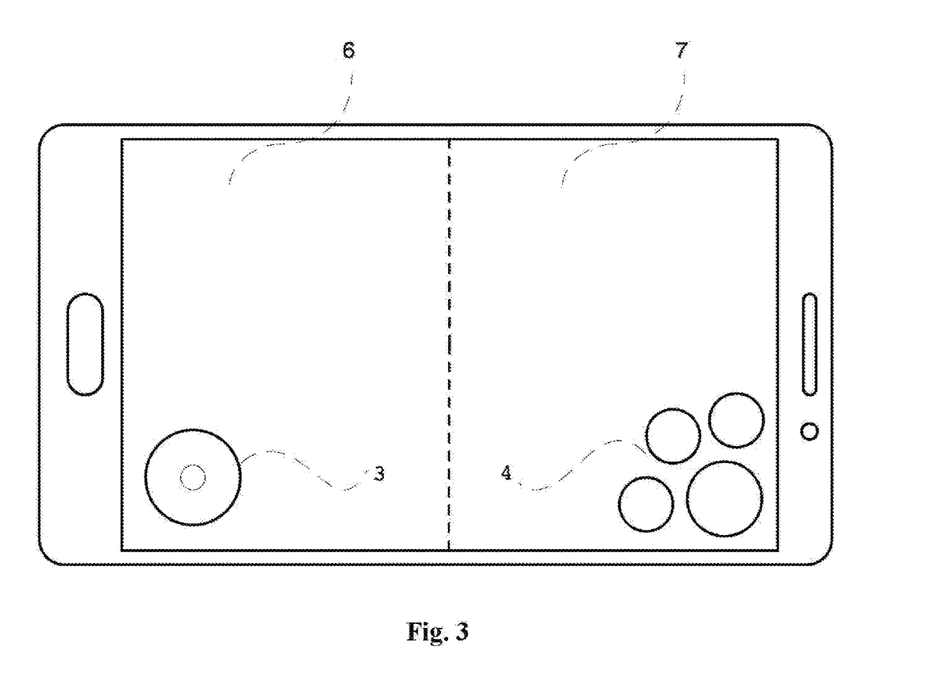
FIG. 3 is a schematic diagram of a game interface according to another exemplary embodiment of the present disclosure.
Figure 4:
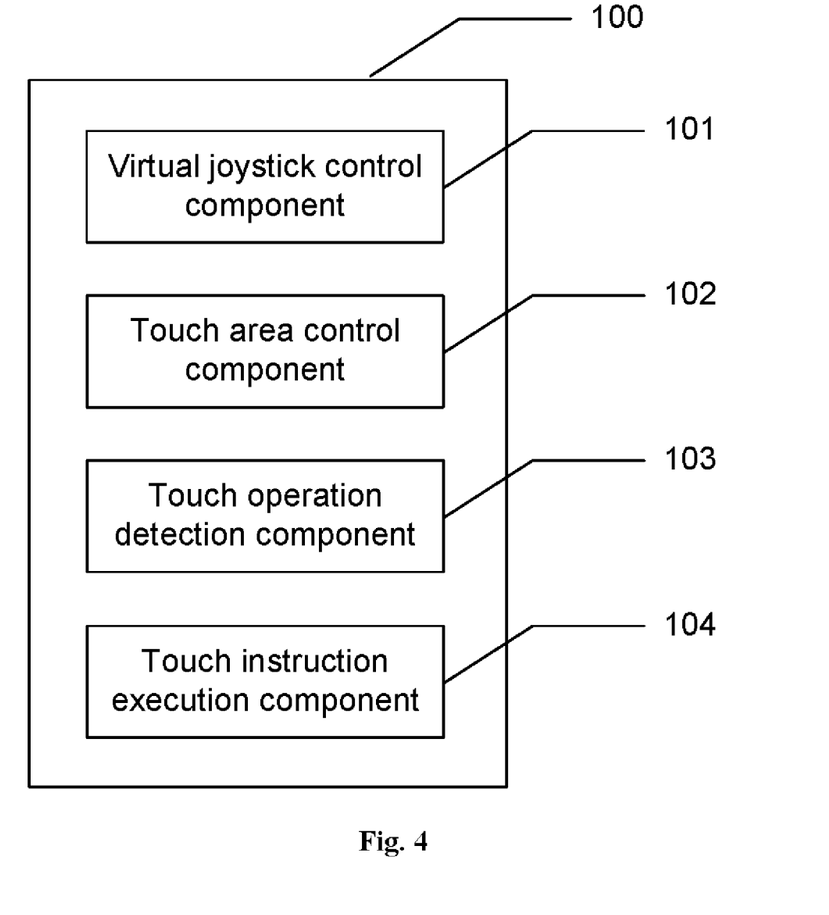
FIG. 4 is a structural block diagram of a shooting game control apparatus according to an embodiment of the present disclosure.

FIG. 2 is a schematic diagram of a game interface according to an exemplary embodiment of the present disclosure. As shown in FIG. 2, a mobile device including a touch screen is in a horizontal screen state, and is held by a player in both hands (the left thumb 1 and the right thumb 2 are shown in the figure). A graphical user interface displayed on the touch screen of the mobile device includes a game scene of a shooting game and a plurality of interactive controls. The game scene at least partially includes a virtual character controlled by the player (i.e., a virtual character controlled by the player, not shown in the figure). For example, the hands of the virtual character controlled by the player and a weapon held by the hands are displayed in an FPS game, and the whole virtual character controlled by the player is displayed in a TPS game. In addition, the game scene also includes at least one of an enemy character, an NPC, or an item (not shown in the figure) that may serve as a shooting target of the virtual character controlled by the player. The graphical user interface also includes a crosshair 5 for aiming.

A virtual joystick control 3 at step S1 may be located in the lower left corner of the graphical user interface. The player may execute a touch operation on the virtual joystick control through the left thumb 1 to control the movement of the virtual character controlled by the player in the game scene. In a mobile shooting game that requires manipulation of the movement of the virtual character controlled by the player, the player needs to control the movement of the virtual character with one finger (usually the left thumb), and control the character view (i.e., the presentation view of the game scene) with another finger (usually the right thumb), thereby controlling the crosshair to aim at a position pointed. In this way, triggering a shooting instruction often requires one of the fingers to execute a temporary operation.

The first touch area and the second touch area are configured to detect the touch operation of the player at step S2. In order to make the player operate with higher flexibility, the first touch area and the second touch are areas on the graphical user interface that are not covered by permanent controls. In other words, areas on the graphical user interface that are not covered by permanent controls may serve as the first touch area and the second touch area. The permanent controls may include at least one of the following: the virtual joystick control, a skill control 4, and a game menu (not shown in the figure).

As described at step S3, a screen sliding operation performed by the player is detected in the first touch area, and a click operation performed by the player is detected in the second touch area. When the screen sliding operation has been detected in the first touch area, the presentation view of the game scene is changed according to a track of the screen sliding operation. When the click operation has been detected, the virtual character controlled by the player is triggered to shoot a position pointed by the crosshair 5 displayed under the current presentation view. If the crosshair points to an enemy character, the enemy character is hit. In general, the player may first execute the screen sliding operation in the first touch area to change the presentation angle of the game scene, thereby changing the position pointed by the crosshair. When the crosshair points to a shooting target, the click operation is performed in the second touch area, thereby triggering the virtual character controlled by the player to shoot the shooting target (i.e., the position pointed by the crosshair under the current presentation view).

The screen sliding operation and the click operation described at step S3 are sequential. In one case, after performing the screen sliding operation, the player performs the click operation. In this case, the player may execute the screen sliding operation and then execute the click operation by the same finger, or the player may execute the screen sliding operation by one finger and then may execute the click operation by another finger. After the screen sliding operation causes the shooting target to be aimed by the crosshair, one shot may be triggered by one click, or multiple shots may be triggered by multiple clicks. In another case, the player performs the click operation first and then performs the screen sliding operation. Similarly, in this case, the player may execute the click operation and then execute the screen sliding operation by the same finger, or the player may execute the click operation by one finger and then may execute the screen sliding operation by another finger.

Different from step S3, an operation time of the screen sliding operation and the click operation described at step S4 overlaps each other. The click operation may occur during performing of the screen sliding operation. In this case, while the player changes the presentation view of the game scene through the screen sliding operation, once it is determined that the crosshair is aimed at the shooting target, the shooting instruction is directly triggered by the click operation, and the screen sliding operation is not stopped. During this process, the finger for performing the screen sliding operation does not leave the touch screen, and a corresponding touch point of the finger may stay at a certain point for a certain period of time, or may continue to move. Similarly, during a screen sliding operation, the player may trigger one shot with one click, or may trigger multiple shots with multiple clicks. Since the presentation view of the game scene changes according to the screen sliding operation, the position pointed by the crosshair will be also changed constantly, and accordingly the shooting position triggered by the click operation will be also changed. Since the click operation is performed before the end of the screen sliding operation, the click operation and the screen sliding operation are performed by different fingers.

With the shooting game control method in the present embodiment, the player may trigger the shooting instruction at any position in a specific area (i.e., the second touch area) in the game scene, without being limited to a specific shooting control. In the first touch area, after aiming at the shooting target through the screen sliding operation, the click operation for triggering the shooting instruction is performed directly by the finger for performing the screen sliding operation at the current position or another finger (located in the second touch area), without moving the finger to the shooting control. Moreover, since the selectable touch area of the player is relatively wide on the graphical user interface, different fingers may be used for aiming and shooting separately, thereby ensuring the timeliness and convenience of the shooting operation. On the other hand, the screen sliding operation changes the presentation view of the game scene, and does not trigger the shooting instruction, thereby overcoming the drawbacks described in the related art that mis-operation on the shooting control triggers shooting to expose the virtual character controlled by the player and waste ammunition.

In an optional embodiment, the method further includes that: the virtual character is also configured to continuously shoot the position pointed by the crosshair displayed under the current presentation view according to a long-press operation detected in the second touch area. In short, the player may trigger continuous shooting by performing the long-press operation in the second touch area.

In an optional embodiment, the method further includes that: when a long-press operation is detected in the second touch area and then the screen sliding operation is detected in the first touch area, the presentation view is changed according to the screen sliding operation to change the position pointed by the crosshair while triggering the virtual character to continuously shoot the position pointed by the crosshair displayed under the current presentation view. In other words, the player performs the long-press operation in the second touch area, and performs the screen sliding operation in the first touch area to trigger strafing (i.e., continuous shooting is performed while the crosshair is moved) before the end of the long-press operation. Further, the long-press operation and the screen sliding operation may be two independent touch operations (completed by different fingers) or one touch operation (i.e., the finger continuously slides the screen without leaving the screen after long-pressing). If the long-press operation and the screen sliding operation are taken as one touch operation, the long-press operation is firstly detected in an overlapping area of the first touch area and the second touch area, and then the screen sliding operation is detected, thereby triggering strafing. In the overlapping area, the click or long-press operation performed by the player is detected, but also the screen sliding operation performed by the player is detected.

In an optional embodiment, the method further includes that: when the screen sliding operation has been detected in the first touch area and then the long-press operation has been detected in the second touch area, the virtual character is triggered to continuously shoot the position pointed by the crosshair displayed under the current presentation view while changing the presentation view according to the screen sliding operation to change the position pointed by the crosshair. In other words, the player performs the screen sliding operation in the first touch area, and performs the long-press operation in the second touch area to trigger strafing before the end of the screen sliding operation. The screen sliding operation and the long-press operation may be two independent touch operations (i.e., the touch operations are performed by different fingers), instead of being performed by a single finger. If a touch operation (i.e., performing the screen sliding operation and then performing the long-press operation) by a single finger may trigger strafing, it is likely that the player will mistakenly trigger continuous shooting due to the finger pause on the screen during the adjustment of the crosshair, and the interactive experience is poor.

The above optional embodiment incorporating a long-press operation, in addition to the advantages of the first embodiment, further increases the richness of the shooting operation.

In an optional embodiment, the second touch area is an area on the graphical user interface that is not covered by permanent controls, and the permanent controls include the virtual joystick control. The second touch area does not include the permanent controls. Correspondingly, the first touch area in the second touch area does not include the permanent controls. In this way, the player may not accidentally touch the permanent controls including the virtual joystick on the graphical user interface during the touch control operation of aiming and shooting, thereby avoiding conflict with other instructions such as moving characters, triggering other character skills, and game system menus.

Further, the second touch area is all other areas than the permanent controls on the graphical user interface. In order to facilitate the player to trigger the shooting instruction, the second touch area for detecting the click operation and the long-press operation is the bigger the better, and in the best embodiment the second touch area is all other areas than the permanent controls on the graphical user interface, that is, all areas that are not covered by the permanent controls in the game scene.

Further, the graphical user interface may be divided into a first part with the virtual joystick and a second part without the virtual joystick, and the first touch area is all other areas than the permanent controls in the second part. As shown in FIG. 3, an optional way is to divide the graphical user interface into two parts: a left half 6 and a right half 7. The left half 6 includes a virtual joystick 3, and the area of the right half not covered by the permanent controls (such as a skill control 4), is the first touch area. The area not covered by the permanent controls (such as the virtual joystick 3, the skill control 4 and other permanent controls not shown in the figure) in the entire graphical user interface displayed on a display screen of a mobile phone is the second touch area. It is apparent that the division of the graphical user interface into a part including the virtual joystick and a part not including the virtual joystick is not limited to the manner shown in FIG. 3, and other manners could be easily conceived by those skilled in the art. For example, the left half may be smaller or larger than the right half, and a shape of the left half may be a fan, a circle and so on. The screen sliding operation of changing the presentation view to adjust the crosshair is generally performed by a finger different from the finger manipulating the virtual joystick (for example, the left thumb controls the joystick, and the right thumb slides the screen to control the crosshair). On the other hand, in order to avoid mutual interference between the manipulation of the virtual joystick and the crosshair, the first touch area may be set as the area in the second part of the graphical user interface not covered by the permanent controls.

In order to distinguish the screen sliding operation, the click operation and the long-press operation performed by the player, the following methods may be used for determination.

A touch event in a monitoring area is detected, and the monitoring area is the first touch area and the second touch area. It should be noted that, for the screen sliding operation, if an initial touch point is located in the first touch area, and then the touch point is moved outside the first touch area (for example, sliding through the skill control), in order to avoid interrupting the touch operation performed by the player, such the screen sliding operation is also considered as the touch event in the monitoring area.

It is assumed that a preset time threshold is T and a preset distance threshold is L. An initial touch point of the finger of the player touching the screen is c1, the following determination result may be obtained.

In the first determination case, a position where the finger of the player leaves the screen within the time threshold T is c2, and a linear distance between c1 and c2 is δ. If δ is less than the preset distance threshold L, the touch event is determined to be a click operation. If δ is greater than the preset distance threshold L, the touch event is determined to be a screen sliding operation.

In the second determination case, the finger of the player does not leave the screen within the time T, but is moved on the screen, and δ is greater than the preset distance threshold L, the touch event is determined to be a screen sliding operation.

In the third determination case, the finger of the player does not leave the screen within the time T and is not moved on the screen or δ is less than the preset distance threshold L, the touch event is determined to be a long-press operation.

In the fourth determination case, the touch event is determined to be a long-press operation and the finger is moved on the screen, and δ is greater than the preset distance threshold L, the touch event is also determined to be a screen sliding operation.

In another embodiment of the present disclosure, a shooting game control apparatus is also provided. The apparatus is applied to a mobile terminal including a touch screen. Contents presented on the graphical user interface at least partially include a game scene and at least partially include a virtual character. The apparatus includes:

a virtual joystick control component, configured to provide a virtual joystick control on the graphical user interface, and to configure the virtual character to move in the game scene in response to at least one touch operation on the virtual joystick control;

a touch area control component, configured to provide a first touch area and a second touch area on the graphical user interface, and the second touch area includes the first touch area or the second touch area is overlapped with the first touch area;

a touch operation detection component, configured to configure a presentation view of the game scene to be changed according to a screen sliding operation detected in the first touch area, and to configure the virtual character to shoot a position pointed by a crosshair displayed under a current presentation view according to a click operation detected in the second touch area; and a touch instruction execution component, configured to trigger, when the screen sliding operation in the first touch area and the click operation in the second touch area are detected at the same time, the virtual character to shoot the position pointed by the crosshair displayed under the current presentation view during a process of changing the presentation view according to the screen sliding operation.

The shooting game control apparatus provided in the present embodiment may facilitate a player to quickly and conveniently trigger a shooting instruction, thereby not only effectively avoiding frequent mis-operation during interaction in a monitoring area, but also avoiding unnecessary target exposure and ammunition waste. Thus, a better gaming experience is provided compared with the related art.

In another embodiment of the present disclosure, a storage medium is also provided. The storage medium includes at least one stored program, and when the at least one program is run, a device where the storage medium is located is controlled to execute the above shooting game control method. The above storage medium may include, but is not limited to, a U disk, a Read-Only Memory (ROM), a Random Access Memory (RAM), a mobile hard disk, a magnetic disk, or an optical disk, and the like, which can store program codes.

In another embodiment of the present disclosure, a processor is also provided. The processor is configured to run at least one program, and when the at least one program is run, the above shooting game control method is executed. The above processor may include, but is not limited to, a processing apparatus such as a Micro Control Element (MCU) or a Field Programmable Gate Array (FPGA).

In another embodiment of the present disclosure, a terminal is also provided. The terminal includes at least one processor, a memory, a display apparatus and at least one program. And the at least one program is stored in the memory, and configured to be executed by the at least one processor. The at least one program is used for executing the above shooting game control method. In some embodiments, the terminal may be a smart phone (e.g., an Android phone, an iOS phone, etc.), a tablet computer, a palmtop computer, and a Mobile Internet Device (MID), a PAD, and other terminal devices. The display apparatus described above may be a touch screen type Liquid Crystal Display (LCD) that enables a user to interact with a user interface of the terminal. In addition, the above terminal may further include: an Input/Output interface (I/O interface), a Universal Serial Bus (USB) port, a network interface, a power supply, and/or a camera.

The sequence numbers of the foregoing embodiments of the present disclosure are merely for description and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be executed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in a element. The integrated element may be implemented in a hardware form or may be implemented in a software function element form.

If the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of instructions enabling a computer device (which may be a personal computer, a server or a network device) to execute all or some of the steps of the method according to each embodiment of the present disclosure. The foregoing storage medium may include, but is not limited to, a U disk, a ROM, a RAM, a mobile hard disk, a magnetic disk, or an optical disk, and the like, which can store program codes.

It is apparent that the described embodiments are a part of the embodiments of the present disclosure, not all of the embodiments. Based on the embodiments in the present disclosure, all other embodiments obtained by a person of ordinary skill in the art without making creative efforts shall fall within the protection scope of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

It should be noted that the steps shown in the flowchart of the drawings may be executed in a computer system such as a set of computer-executable instructions, and although the logical sequence is shown in the flowchart, in some cases, the illustrated or described steps may be executed in an order different than this.

What is claimed is:

1. A shooting game control method, applied to a mobile terminal comprising a touch screen, and provided by executing a software application on a processor of the mobile terminal and rendering a graphical user interface on the touch screen, contents presented on the graphical user interface at least partially comprising a game scene and at least partially comprising a virtual character, the method comprising:

providing a virtual joystick control on the graphical user interface, and configuring the virtual character to move in the game scene in response to at least one touch operation on the virtual joystick control;

providing a first touch area and a second touch area on the graphical user interface, wherein the second touch area comprises the first touch area, or the second touch area is overlapped with the first touch area;

configuring a presentation view of the game scene to be changed according to a screen sliding operation detected in the first touch area, and configuring the virtual character to shoot a position pointed by a crosshair displayed under a current presentation view according to a click operation detected in the second touch area; and when the screen sliding operation in the first touch area and the click operation in the second touch area are detected at the same time, triggering the virtual character to shoot the position pointed by the crosshair displayed under the current presentation view during a process of changing the presentation view according to the screen sliding operation.

2. The method as claimed in claim 1, further comprising: configuring the virtual character to continuously shoot the position pointed by the crosshair displayed under the current presentation view according to a long-press operation detected in the second touch area.

3. The method as claimed in claim 2, further comprising: when the long-press operation in the second touch area has been detected and then the screen sliding operation in the first touch area is detected, changing the presentation view according to the screen sliding operation to change the position pointed by the crosshair while triggering the virtual character to continuously shoot the position pointed by the crosshair displayed under the current presentation view.

4. The method as claimed in claim 3, wherein when the screen sliding operation performed right after the long-press operation in an overlapping area of the first touch area and the second touch area is detected, changing the presentation view according to the screen sliding operation to change the position pointed by the crosshair while triggering the virtual character to continuously shoot the position pointed by the crosshair displayed under the current presentation view.

5. The method as claimed in claim 2, further comprising: when the screen sliding operation in the first touch area has been detected and then a long-press operation in the second touch area is detected, triggering the virtual character to continuously shoot the position pointed by the crosshair displayed under the current presentation view while changing the presentation view according to the screen sliding operation to change the position pointed by the crosshair.

6. The method as claimed in claim 5, wherein the screen sliding operation and the long-press operation are two independent touch operations.

7. The method as claimed in claim 1, wherein the second touch area is an area other than permanent controls on the graphical user interface, the permanent controls comprising at least one of the following: the virtual joystick control, a skill control, and a game menu.

8. The method as claimed in claim 7, wherein the second touch area is all other areas than the permanent controls on the graphical user interface.

9. The method as claimed in claim 8, wherein the graphical user interface comprises a first part with the virtual joystick control arranged therein and a second part without the virtual joystick, and the first touch area is an area other than the permanent controls in the second part.

10. A shooting game control apparatus, applied to a mobile terminal comprising a touch screen, and provided by executing a software application on a processor of the mobile terminal and rendering a graphical user interface on the touch screen, contents presented on the graphical user interface at least partially comprising a game scene and at least partially comprising a virtual character, the apparatus comprising:
 a virtual joystick control component, configured to provide a virtual joystick control on the graphical user interface, and to configure the virtual character to move in the game scene in response to at least one touch operation on the virtual joystick control;
 a touch area control component, configured to provide a first touch area and a second touch area on the graphical user interface, wherein the second touch area comprises the first touch area or the second touch area is overlapped with the first touch area;
 a touch operation detection component, configured to configure a presentation view of the game scene to be changed according to a screen sliding operation detected in the first touch area, and to configure the virtual character to shoot a position pointed by a crosshair displayed under a current presentation view according to a click operation detected in the second touch area; and
 a touch instruction execution component, configured to trigger, when the screen sliding operation in the first touch area and the click operation in the second touch are detected at the same time, the virtual character to shoot the position pointed by the crosshair displayed under the current presentation view during a process of changing the presentation view according to the screen sliding operation.

11. A storage medium, comprising at least one stored program, wherein when the at least one program is running, a device where the storage medium is located is controlled to execute the method as claimed in claim 1.

12. A processor, configured to run at least one program, wherein the at least one program is run to execute the method as claimed in claim 1.

13. A terminal, comprising: at least one processor, a memory, a display apparatus and at least one program, wherein the at least one program is stored in the memory, and configured to be executed by the at least one processor, the at least one programs being used for executing the following method as claimed in claim 1:
 providing a virtual joystick control on the graphical user interface, and configuring the virtual character to move in the game scene in response to at least one touch operation on the virtual joystick control;
 providing a first touch area and a second touch area on the graphical user interface, wherein the second touch area comprises the first touch area or the second touch area is overlapped with the first touch area;
 configuring a presentation view of the game scene to be changed according to a screen sliding operation detected in the first touch area, and configuring the virtual character to shoot a position pointed by a crosshair displayed under a current presentation view according to a click operation detected in the second touch area; and
 when the screen sliding operation in the first touch area and the click operation in the second touch area are detected at the same time, triggering the virtual character to shoot the position pointed by the crosshair displayed under the current presentation view during a process of changing the presentation view according to the screen sliding operation.

14. The method as claimed in claim 1, further comprising: when the screen sliding operation in the first touch area is detected, changing the presentation view of the game scene according to a track of the screen sliding operation.

15. The method as claimed in claim 9, wherein the first part and the second part are set according to one of the following manners:
 the first part is equal to the second part;
 the first part is greater than the second part; and
 the first part is less than the second part.

* * * * *